United States Patent
Kasper

[11] 3,743,808
[45] July 3, 1973

[54] METHOD OF CONTROLLING THE INDUCTION HEATING OF AN ELONGATED WORKPIECE

[75] Inventor: Robert J. Kasper, Seven Hills, Ohio
[73] Assignee: Growth International, Inc., Cleveland, Ohio
[22] Filed: Mar. 27, 1972
[21] Appl. No.: 238,232

[52] U.S. Cl. ............ 219/10.41, 219/10.77, 266/5E
[51] Int. Cl. .............................................. H05b 5/04
[58] Field of Search ................. 219/10.41, 10.43, 219/10.75, 10.77; 266/4 E, 5 E

[56] References Cited
UNITED STATES PATENTS
2,459,616  1/1949  Burgwin .................... 219/10.77
2,643,325  6/1953  Body et al. .................. 219/10.41
2,971,754  2/1961  Seyfried .................... 219/10.77 X
3,622,138  11/1971  Kostyal ...................... 266/4 E Primary Examiner—J. V. Truhe
Assistant Examiner—B. A. Reynolds
Attorney—James H. Tilberry, Robert V. Vickers et al.

[57] ABSTRACT

There is provided a method of controlling the heating of an elongated, rotating workpiece between a starting point and an ending point when the workpiece is being heated by an induction heating coil surrounding the workpiece and energized by a controllable power supply. The method includes controlling the power through the inductor and/or the scanning velocity of the inductor by comparing the instantaneous power and the instantaneous velocity with a known energy distribution profile.

7 Claims, 7 Drawing Figures

Patented July 3, 1973
3,743,808
3 Sheets-Sheet 3
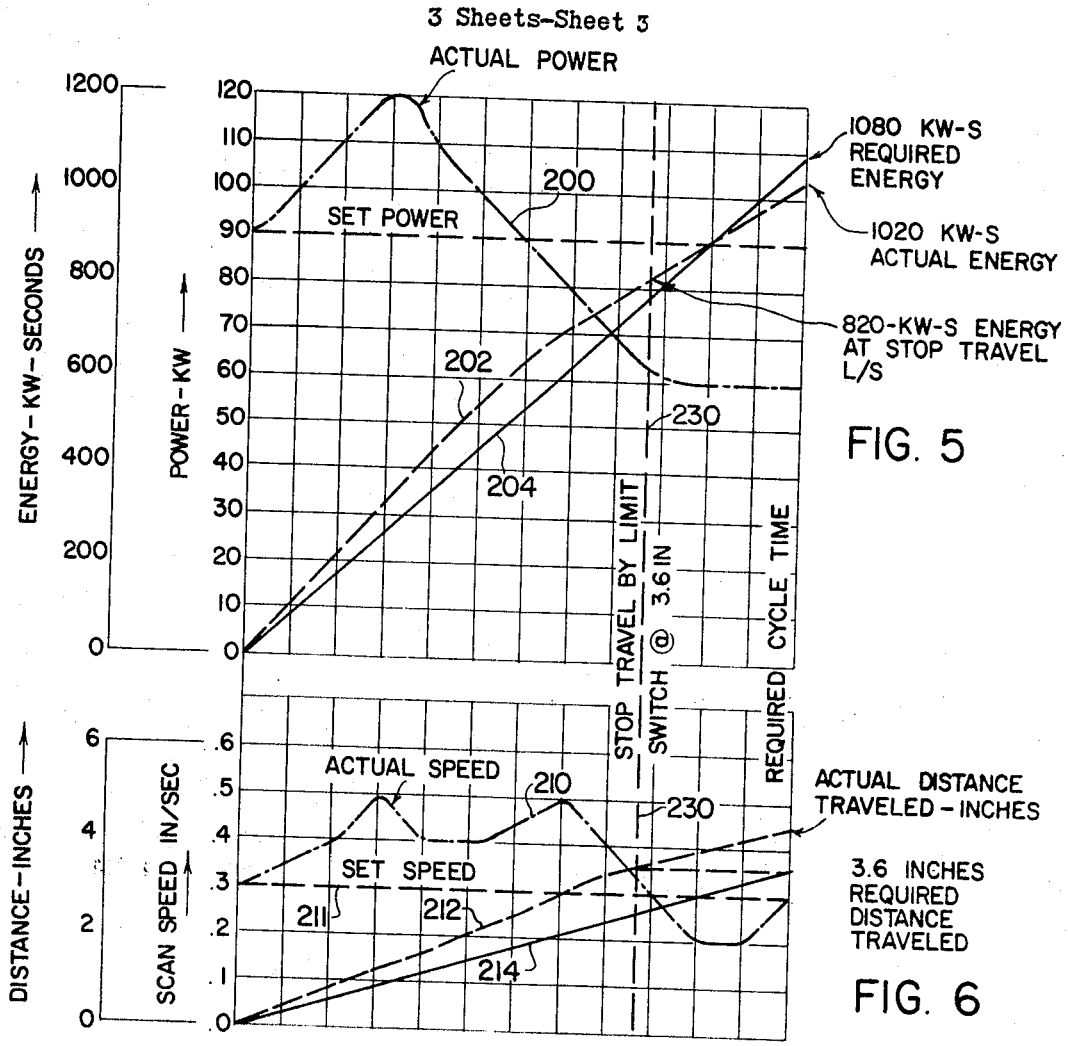
FIG. 5
FIG. 6
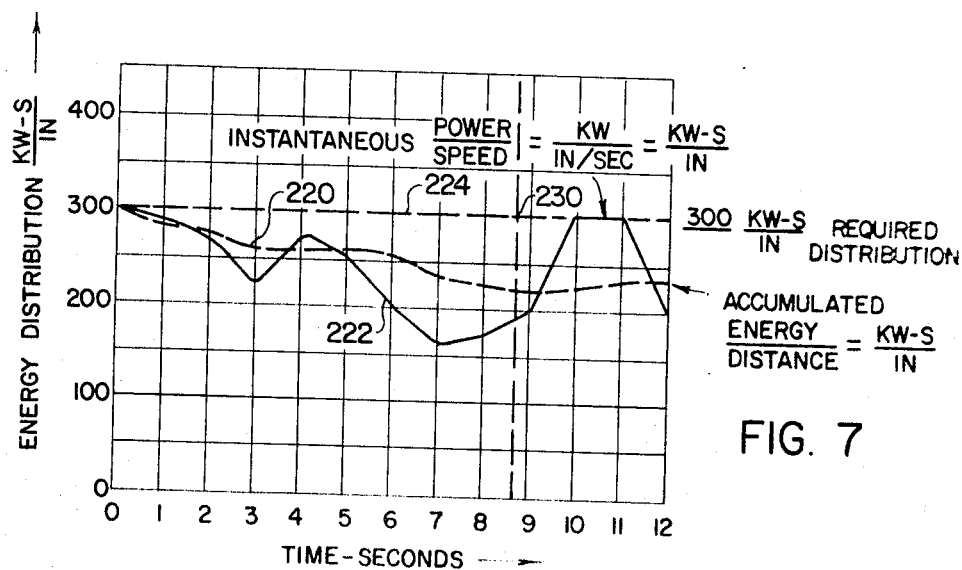
FIG. 7

METHOD OF CONTROLLING THE INDUCTION HEATING OF AN ELONGATED WORKPIECE

This invention relates to the art of induction heating and more particularly to a method of controlling the induction heating of an elongated workpiece.

The invention is particularly applicable for inductively heating an elongated workpiece having a series of different energy requirements along its length, and it will be described with particular reference thereto; however, it should be appreciated that the invention has broader applications and may be used for inductively heating various types of elongated workpieces in an apparatus including an inductor surrounding the workpiece and moved therealong.

The induction heating of elongated workpieces has become common practice. Generally, the workpiece is rotated about its longitudinal axis while an energized, encircling inductor is scanned along the length of the workpiece. Quenching units posititioned behind the inductor immediately quench harden the inductively heated portions of the workpiece. To obtain the necessary heating of the workpiece, prior to quench hardening, it is known that the input energy applied to the workpiece during the scanning must be controlled within selected limits. If the energy is too high at certain areas, these areas are overheated. Conversely, if the energy is too low in certain areas, these areas are insufficiently heated for subsequent hardening. Extensive work has been done to control the input energy applied to the workpiece by the scanning inductor. The most common arrangement is to control the power applied to the inductor by any of several power supply control arrangements. This method does produce satisfactory results; however, controlling the power alone does not compensate for instantaneous variations in the scanning velocity of the inductor. If the inductor is moved too rapidly, the heating energy is too low. If the scanning velocity is too low, the heating energy applied to the workpiece is too high. This difficulty is compounded when the energy requirements along the length of the workpiece vary. This is true especially when the cross-section of the elongated workpiece varies.

To change the applied power to correspond with varying energy requirements, it is somewhat common practice to place a series of limit switches along the path of movement of the inductor or the workpiece, according to which is being moved. When certain areas of the workpiece are adjacent to the inductor, the limit switch changes the power applied to the inductor by changing the output power of the power supply. When this arrangement is used with a mechanism for controlling the energy in the various portions of the workpiece, generally more energy than is needed is applied to the workpiece to assure complete hardening.

When hardening an elongated workpiece having a uniform cross-section and uniform energy requirements, it has been common practice to maintain a constant output power to the inductor and a constant scanning velocity. The limit switch is provided for indicting the proper travel of the inductor along the workpiece. In this type of installation, if the power is too high or the velocity is too low, in certain portions of the workpiece, this portion of the workpiece is overheated. In a like manner, if the power is too low or the velocity is too high in a certain portion of the workpiece, then the energy input at that portion is too low for optimum heating. By using a limit switch, the inductor may reach the limit switch before the required total energy is applied to the workpiece. At that time, the coil is deenergized irrespective of improper heating. To allow for this type of situation, it has been suggested to measure the accumulated total energy input to the workpiece during the heating cycle. This is done by measuring the instantaneous power and integrating it with respect to time. If the accumulated energy varies from a preselected quantity when the limit switch is contacted and the inductor is deenergized, there is provided a device to indicate a malfunction of the installation. An arrangement for accomplishing this function is found in prior U.S. Pat. application Ser. No. 185,316, filed Sept. 30, 1971. This prior copending patent application is incorporated by reference in the present application.

The present application overcomes the difficulties found in prior methods of heating an elongated, rotating workpiece by scanning an encircling inductor along the length of the workpiece. In accordance with the present invention, the instantaneous power is sensed and measured during the scanning cycle. The instantaneous scanning velocity is also measured. These two instantaneous values are compared to provide an energy value in Kw-sec/inches. This value, known as the energy distribution value along the length of the workpiece, is then compared to a known energy distribution profile for the workpiece and appropriate corrections are made instantaneously in either the power applied to the inductor and/or the instantaneous scanning velocity of the inductor. The energy distribution profile is a representation of the desired input energy at each position in the scanning cycle. This can be accomplished by generating a signal having a level which varies in a known manner as the inductor moves along the workpiece. This control process is distinguished from a process for controlling the energy profile by measuring the accumulated energy and the displacement of the coil in its scanning cycle. This latter type of arrangement, although providing a similar result, has been found to be less variable in nature and therefore less conducive to rapid adjustment for quality control of the scanning cycle.

The primary object of the present invention is the provision of a method for controlling the heating of an elongated, rotating workpiece by a scanning inductor, which method utilizes the instantaneous power and instantaneous scanning velocity to control the input energy along the length of the workpiece.

Another object of the present invention is the provision of a method for controlling the heating of an elongated, rotating workpiece by a scanning inductor, which method provides rapid adjustment of the energy applied to the workpiece as it is being heated by the inductor with a small number of circuits.

These and other objects and advantages will become apparent from the following description taken together with the accompanying drawings in which.

Figure 1:
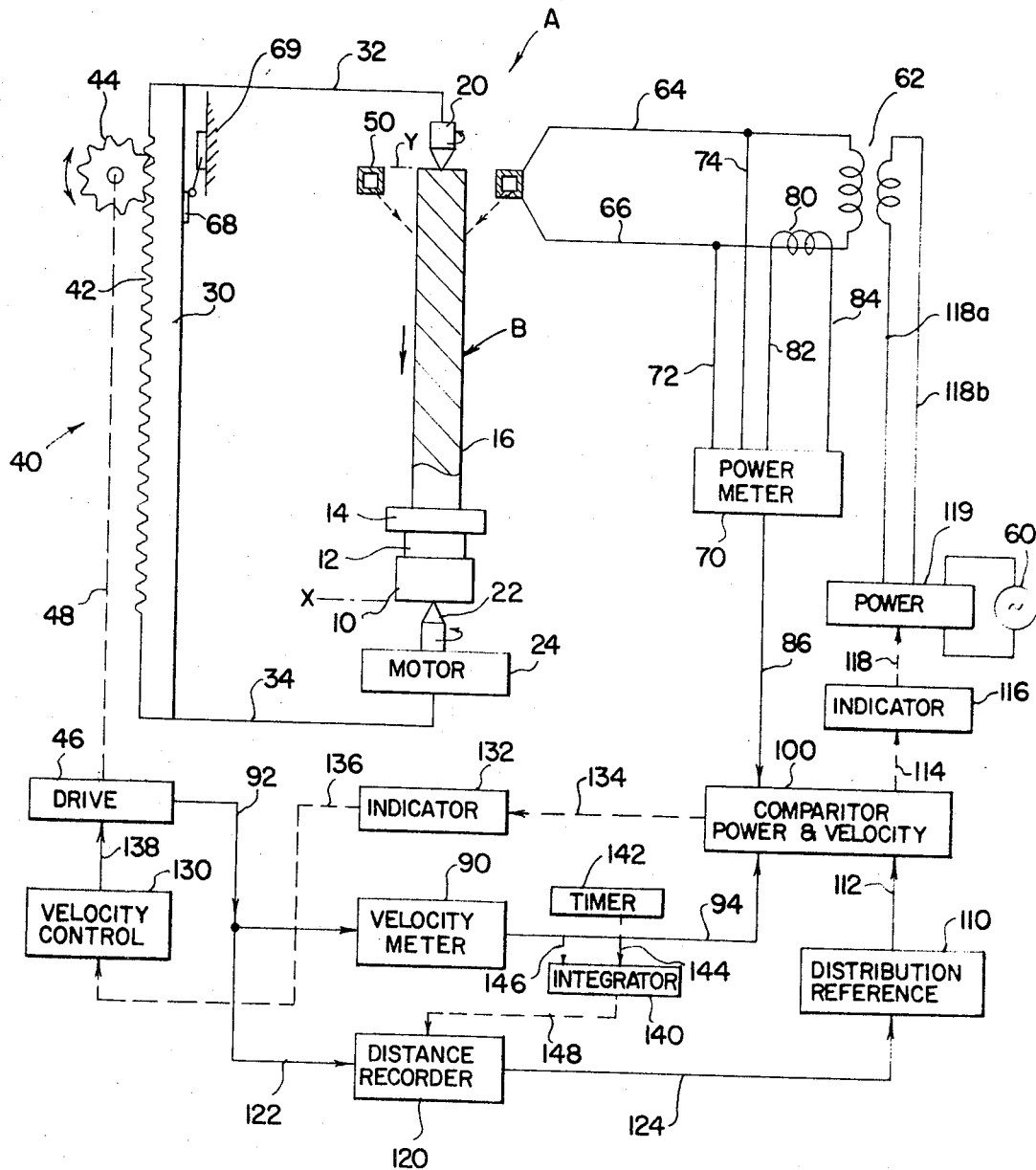
FIG. 1 is a schematic block diagram illustrating a preferred embodiment of the present invention.

Referring now to the drawings wherein the showings are for the purpose of illustrating the preferred embodiment of the invention and not for the purpose of limiting same, FIG. 1 shows an induction heating installation A for inductively heating elongated workpiece B which may have a uniform cylindrical surface to be heated; however, in accordance with the illustrated embodiment of the invention, the workpiece includes a plurality of separate, axially spaced cylindrical portions 10, 12, 14 and 16 which are to be inductively heated. The workpiece B is mounted between two spaced centers 20, 22 and is rotated by an appropriate rotating drive 24. The centers and drive are mounted upon a reciprocal support 30 having schematically illustrated arms 32, 34. To reciprocate the support 30 and the rotating workpiece B along the workpiece axis, there is provided an appropriate mechanism 40 of any known design such as a rack 42, pinion 44, drive 46 and a link 48. Surrounding the workpiece there is provided a standard scanning inductor 50 connected to a power supply 60 through a transformer 62 and output leads 64, 66.

As so far described, the induction heating apparatus A is constructed substantially in accordance with common practice. A workpiece B is rotated by drive device 24 about its central axis. The inductor 50 is energized and the drive device 46 rotates pinion 40 to reciprocate the support 30. The starting point for the heating cycle is indicated on the workpiece as X and the ending point for the heating cycle is indicated by Y. An appropriate cam 68 secured onto support 30 coacts with limit switch 69 to deactivate the inductor when the point Y is opposite the inductor, as shown in FIG. 1. Thereafter the workpiece is removed by backing off one or more of the centers 20, 22. In this type of operation, it is important that proper power is suplied to the inductor at all positions between the starting point X and the ending point Y. If the workpiece B were a cylindrical workpiece having a uniform diameter, the power should be maintained at a selected level, assuming a constant scanning speed; however, in accordance with the illustrated embodiment of the invention, the power requirements change as the inductor is opposite to the various cylindrical portions 10, 12, 14 and 16, respectively. In the past, this type of workpiece was controlled by a series of limit switches which would change the input power at the various cylindrical portions. This presented some difficulty because variations in the instantaneous power and the instantaneous velocity adversely affected the resulting heating pattern along the length of the workpiece. To control the heating along the workpiece, it has been common practice to attempt to control the power within narrow limits. This does not compensate for any variations in the speed at which the workpiece was moving axially during the scanning operation. Variations in this speed or velocity caused instantaneous variations in the heating along the workpiece. The heating along the workpiece is generally defined as energy distribution with the units of Kw-sec/inch which is indicative of the total energy being introduced into the workpiece in any selected distance. This energy distribution can be represented as a profile for any given workpiece with the value changing according to the specific and exact energy requirement at the various positions along the axis of the workpiece. As previously stated, there was generally an assumption that a preselected scanning velocity was used; therefore, control of the energy distribution along the length of the workpiece was by controlling the input power at various axial positions determined by various limit switches on the support 30. The energy was also controlled by changing the preselected scanning velocity of certain portions of the workpiece. The present invention relates to a new method for controlling the energy distribution along the length of a rotating, elongated workpiece which is more accurate and provides a more rapid correction of any deviation of the actual energy distribution with the desired energy distribution along the workpiece.

In accordance with the present invention, the power applied to th inductor 50 is measured by an appropriate power meter 70 having voltage sensing lines 72, 74 and a current sensing coil 80 connected to the power meter by lines 82, 84. The output of the power meter 70 is a signal representative of instantaneous power and is directed through the output lead 86. In accordance with the invention, the instantaneous velocity of the support 30 is measured by an appropriate velocity meter 90 connected with drive 46 through line 92. Meter 90 has an output 94 through which there is directed a signal representative of the instantaneous velocity of the support 30, and thus the scanning velocity of inductor 50. The instantaneous power signal in line 86 and the instantaneous velocity signal in line 94 are combined by a comparator 100 which produces a signal, by known circuitry, which is representative of the energy distribution at any particular point in the scanning of the workpiece between the starting point X and the ending point Y. This instantaneous distribution value, in Kw-sec/inch, is obtained by dividing the power signal by the velocity signal. These signals are appropriately calibrated to produce an energy distribution signal in kilowatts-seconds per inch at the various points along the workpiece. It is noted by the units of the instantaneous energy distribution value that this value could be obtained by dividing the energy input (Kw-sec) at a particular location in the workpiece by the displacement (inches) of the workpiece. This would give the same dimensional units of Kilowatts-seconds per inch; however, in accordance with the present invention, and for reasons to be hereinafter explained, the energy distribution value which is used to control the heating of the workpiece is obtained by a division of the instantaneous power by the instantaneous velocity.

The desired energy distribution along the length of the workpiece is programmed into the distribution reference device 110 having a transfer line 112 connected to the comparator 100. This profile indicates the particular energy level to be obtained at all locations along the length of the workpiece between points X and Y. The actual energy distribution obtained by dividing the signal of line 86 with the signal of line 94 is compared with the reference signal indicative of the energy distribution value required at the particular point in the scanning cycle. This required value emanates from the device 110. The comparison of the actual energy distribution with the required distribution at each point in the scanning cycle produces a differential signal in line 114. This differential signal is indicative of the amount and direction of deviation in the desired energy distribution and the actual energy distribution. An indicator 116 receives the differential signal and indicates the amount of deviation and/or when the deviation value is beyond acceptable limits. If the deviation is beyond acceptable limits, the heating operation may be discontinued and the workpiece rejected. Assuming that the deviation is within prescribed limits, a correcting signal is directed through line 118 to power control 119 which then adjusts the power directed from the power supply 60 to the transformer 62. In this manner, the correction of the instantaneous power is made to adjust the actual energy distribution toward the reference or required energy distribution for each scanning position between points X and Y. To shift continuously the distribution reference 110 to correspond with the actual scanning position of the inductor, there is provided any appropriate device. In accordance with the illustrated embodiment, a distance recorder 120 is employed for this purpose. This recorder has an input 122 connected with drive 46 and an output 124 connected to the distribution reference device 110. The actual displacement of the workpiece, thus, shifts the reference 110 through the recorder 120. This arrangement provides a direct measurement of displacement from point X in the scanning cycle. Of course, it is possible to shift or move the distribution value by a direct reading of the displacement of the workpiece by using a translation sensor on suport 30.

As so far described, the deviations in the actual energy distribution and the reference energy distribution is corrected by adjusting the input power to the inductor. The same result can be accomplished by adjusting the scanning velocity of the workpiece. To accomplish this, an alternative arrangement is illustrated in FIG. 1 wherein there is provided a velocity control 130, an indicator 132, having an input 134 and an output 136, and a control line 138. When the comparator 100 indicates a deviation of the energy distribution from the desired energy distribution, a corrective signal is directed to indicator 132 through line 134. As previously mentioned with regard to indicator 116, indicator 132 can reject the workpieces if the deviation between the desired and actual distribution values exceeds a given limit. Assuming that it does not, a corrective signal is directed through line 136 to the velocity control 130 which, in turn, controls the velocity of drive 46 through line 138.

The embodiment shown in FIG. 1 illustrates a further modification for recording the distance that inductor 50 has scanned at any particular time. To accomplish this, there is provided an integrator 140 connected to a timer 142 by line 144, and a line 146 for directing the instantaneous velocity signal from line 94 to the integrator. The instantaneous velocity is then integrated with respect to time to give an indication of the actual scanning displacement of the inductor, which displacement generates a signal that is introduced into line 148 to the distance recorder 120. Of course, other arrangements could be provided for measuring the actual displacement of the workpiece with respect to the inductor during the heating cycle to control accurately the distribution reference device 110.

In summary, the invention relates to controlling the energy distribution in a scanning arrangement for inductively heating an elongated, rotating workpiece, which control is accomplished by comparing the instantaneous power and the instantaneous velocity as opposed to other parameters in the induction heating installation A.

Figures 2, 3, 4:
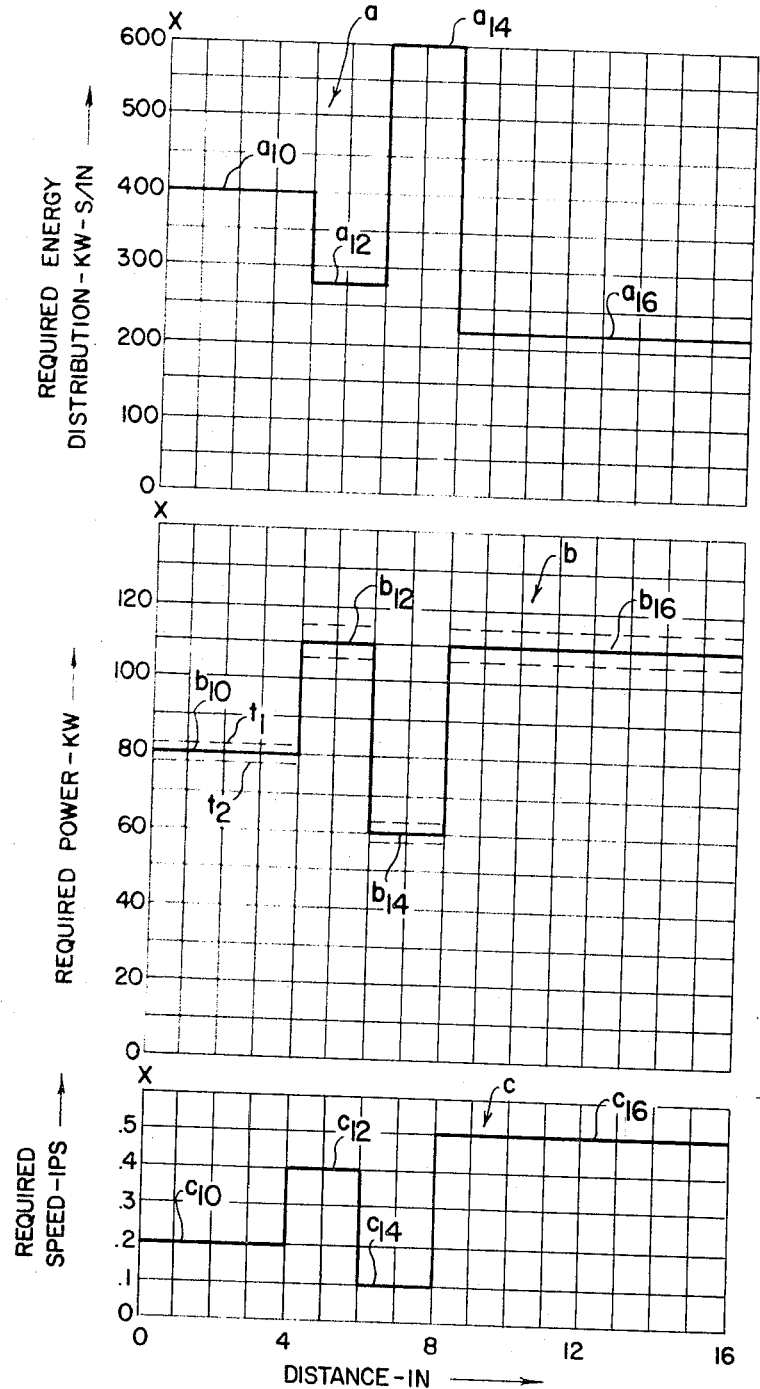
FIGS. 2, 3 and 4 are graphs illustrating operating characteristics of the preferred embodiment shown in FIG. 1; and, FIGS. 5, 6 and 7 are graphs explaining the theory of the present invention.

Referring now to FIGS. 2, 3 and 4, these figures represent the required energy distribution, power and speed or velocity at various points along the workpiece B. FIG. 2 has a graph $a$ which represents the required energy distribution at various locations along the workpiece. The shape of graph $a$ is the energy distribution profile between points X and Y. The level of graph $a$ at each displacement along the workpiece is the required energy distribution at that scanning position. FIG. 3 illustrates a graph $b$ showing the power which is desired to accomplish the energy distribution profile shown in FIG. 2. FIG. 4 illustrates a graph $c$ which illustrates the desired speed or velocity at the various points along the workpiece. Each of these graphs $a$, $b$ and $c$ has numbered portions, such as $a_{10}$, $b_{10}$, and $c_{10}$ which is indicative of the level at the various illustrated parameters at corresponding cylindrical portions of the workpiece B, as shown in FIG. 1.

Referring now to FIG. 3, the dotted lines $t_1$ and $t_2$ are the limits in the power at the various cylindrical portions of the workpiece. If the indicator 116 indicates a deviation beyond limits $t_1$, $t_2$ the workpiece is rejected and the heating cycle is stopped and appropriate corrections are made.

Referring now to FIGS. 5, 6 and 7, there is illustrated three charts which explain the present invention. In these charts it is assumed that the inductor is to scan along a uniformed diameter cylindrical workpiece at a power of 90 kilowatts, a speed or velocity of 0.3 inches per second to produce a uniform energy distribution of 300 kilowatts-seconds per inch. With these parameters, a stop switch can be set at 3.6 inches and appropriate heating should have taken place with this displacement and in approximately 12 seconds. This is assuming that the actual power remains constant and at the selected value and the actual velocity or speed remains constant and at the selected value.

FIGS. 5, 6 and 7 illustrate a normal, but assumed, situation where the actual power and actual speed varies with respect to the set or selected values. FIG. 5 is a chart having an abscissa of scanning time in seconds between 0–12 seconds. This chart includes two ordinates, the first being accumulated energy (Kw-sec) and the second being power (Kw). Line 200 represents the actual power, line 202 represents the actual accumulated energy, and line 204 represents the accumulated energy to obtain the ultimate required accumulated energy (1,080 Kw-sec) in the 12 seconds. This value of 1,080 Kw-sec can be obtained by multiplying the energy distribution of 300 Kw-sec/inch times the 3.6 inches of desired displacement.

Referring now to FIG. 6, again, the abscissa is time in seconds from 0–12. The dual ordinates are scanning speed or velocity (inches/sec) and distance (inches). Of course, the distance is the integration of the actual velocity per unit time. Line 210 represents the assumed varying speed, and line 211 is the set speed of 0.3 inches/second. Line 212 represents the actual displacement obtained by integrating line 210. Line 214 represents the desired situation wherein a uniform speed is used to obtain the desired displacement of 3.6 inches in 12 seconds.

FIG. 7 is a chart having an abscissa, again, of time in seconds between 0–12. The ordinate is energy distribution (Kw-sec/inch). Line 220 represents the energy distribution by dividing the accumulated energy (Kw-sec) represented by line 202 of FIG. 5 by the actual scanning displacement (inches) represented by line 212 of FIG. 6. Line 222 of FIG. 7 is the energy distribution obtained by dividing the actual power (Kw) as represented in line 200 of FIG. 5 and the actual speed or velocity (inches/sec) represented by line 210 of FIG. 6.

In analyzing the charts shown in FIGS. 5, 6 and 7, after 12 seconds of heating, the actual energy is 1,020 Kw-sec, as shown by line 202 of FIG. 5. This is below the desired amount of total energy which is 1,080 Kw-sec shown by line 204 of FIG. 5. Consequently, when this workpiece is heated for 12 seconds, it will not receive the required total energy input (Kw-sec) and will be rejected.

Referring now to FIG. 6, the total displacement, at 12 seconds, during the actual heating cycle would be 4.4 inches which is substantially greater than the mechanically set displacement of 3.6 inches because of the assumed variation of the actual scanning velocity from the set or selected scanning velocity. It is seen that the total energy input in the heating cycle depicted in the charts would be below the required energy and the scanning distance would be above the desired length of 3.6 inches. Assuming that the inductor were deenergized after the desired 3.6 inches of displacement, such as by actuation of a limit switch, the parameters of the heating cycle would be those obtained along line 230 of FIGS. 5, 6 and 7. Reading these values, the actual energy input would be 820 Kw-sec. The actual displacement would be the desired 3.6 inches.

The charts of FIGS. 5, 6 and 7 represent an assumed heating cycle which would be contemplated in practice when the scanning length is the basic determination of the heating cycle and the power and speed is allowed to vary. If, as is common practice, the actual power is controlled within preselected limits, variation in the actual speed itself will cause variations in the actual heating cycle for the rotating workpiece. The present invention relates to a control of the heating cycle to obtain the necessary 300 Kw-sec/inch at all areas along the total length of the workpiece. This invention is best explained by consideration of FIG. 7 wherein line 220 is the graphic illustration of one method for determining the actual energy distribution (Kw-sec) along the length of the workpiece. This line is obtained by dividing line 202 by line 212. It is noted that line 220 does not vary drastically with changes in actual power and velocity during the heating cycle. In accordance with the invention, the energy distribution is controlled by dividing instantaneous power (Kw) of line 200 by instantaneous speed or velocity (inches/second) of line 210. This is illustrated in line 222 of FIG. 7. It is noted that this particular arrangement for determining the actual energy distribution of the heating cycle causes the energy distribution curve to vary drastically with changes in the instantaneous power (Kw) and the instantaneous velocity (inches/second). Consequently, this type of control is more rapidly corrected to reduce the displacement of line 222 from the actual energy profile, which in the assumed heating cycle is 300 Kw-sec/inch and is represented by line 224 of FIG. 7. This illustrates the advantage of the present invention in controlling a scanning inductor by the instantaneous power and instantaneous velocity as opposed to other means such as dividing the energy by the displacement distance. Even this latter arrangement is also believed to be new and would be more likely to be adaopted as a controlling arrangement because there are meters for measuring actual applied energy and the object of the control is to control the energy at various positions along the workpiece.

The charts shown in FIGS 5, 6 and 7 have been submitted only for the purpose of illustrating the advantage of the present invention and relates to a situation where a uniform energy distribution is to be applied along the total length of a given rotating workpiece. The same principles apply when heating a workpiece having various energy requirements along the workpiece. By using the present invention the power and velocity is used directly without requiring intermediate modification of these parameters by integrating instantaneous power (Kw) by time (sec) to obtain instantaneous energy (Kw-sec) and integrating instantaneous velocity (inches-sec) to obtain accumulated displacement (inches). This simplifies the number of controlling circuits and the resulting accumulation of possible errors.

Having thus described my invention, I claim:

1. A method of controlling the heating of an elongated, rotating workpiece between a starting point and an ending point on said workpiece, said workpiece bein being by an induction heating coil surrounding the workpiece and energized by a controllable power supply, as said coil scans along said workpiece at a scanning velocity, said method comprising the steps of:
 a. sensing the instantaneous power applied to said coil;
 b. creating a first signal representative of said sensed instantaneous power;
 c. sensing the instantaneous scanning velocity of said coil with respect to said workpiece;
 d. creating a second signal representative of said sensed instantaneous scanning velocity;
 e. combining said first and second signals to produce a third signal representative of the instantaneous energy distribution;
 f. providing a known energy distribution signal level profile for longitudinal displacement from said starting point to said ending point;
 g. sensing the displacement of said coil from said starting point;
 h. creating a fourth signal representative of said sensed displacement;
 i. selecting an instantaneous portion of said distribution signal level profile corresponding to said fourth signal;
 j. comparing said third signal with said portion of said distribution signal level profile to produce a differential signal representative of the difference between said third signal and said portion of said profile; and,
 k. adjusting said power of said power supply in accordance with said differential signal.

2. The method as defined in claim 1 including the step of adjusting said instantaneous scanning velocity in accordance with said differential signal.

3. The method as defined in claim 1 wherein said displacement sensing step includes the step of intergrating said sensed instantaneous scanning velocity with respect to scanning time from said starting point.

4. A method of controlling the heating of an elongated, rotating workpiece between a starting point and an ending point on said workpiece, said workpiece being heated by an induction heating coil surrounding the workpiece and energized by a controllable power supply, as said coil scans along said workpiece at a scanning velocity, said method comprising the steps of:
 a. sensing the instantaneous power applied to said coil;

b. creating a first signal representative of said sensed instantaneous power;
c. sensing the instantaneous scanning velocity of said coil with respect to said workpiece;
d. creating a second signal representative of said sensed instantaneous scanning velocity;
e. combining said first and second signals to produce a third signal representative of the instantaneous energy distribution;
f. providing a known energy distribution signal level profile for longitudinal displacement from said starting point to said ending point;
g. sensing the displacement of said coil from said starting point;
h. creating a fourth signal representative of said sensed displacement;
i. selecting an instantaneous portion of said distributuion signal level profile corresponding to said fourth signal;
j. comparing said third signal with said portion of said distribution signal level profile to produce a differential signal representative of the difference between said third signal and said portion of said profile; and,
k. adjusting said scanning velocity of said coil in accordance with said differential signal.

5. The method as defined in claim 4 wherein said displacement sensing step includes the step of integrating said sensed instantaneous scanning velocity with respect to scanning time from said starting point.

6. A method of controlling the heating of an elongated, rotating workpiece between a starting point and an ending point on said workpiece, said workpiece being heated by an induction heating coil surrounding the workpiece and energized by a controllable power supply, as said coil scans along said workpiece at a scanning velocity, said method comprising the steps of:
a. scanning said coil along said workpiece between said starting point and said ending point;
b. creating a first signal representative of the instantaneous power being created by said coil during said scanning step;
c. creating a second signal representative of the instantaneous velocity during said scanning step;
d. combining the first signal and the second signal into a power-velocity signal as said coil scans said workpiece between said starting point and said ending point;
e. simultaneously comparing said power-velocity signal with a desired power-velocity signal for each position along said workpiece and during said scanning step; and,
f. adjusting said power of said power supply in accordance with said comparison during said scanning step.

7. A method of controlling the heating of an elongated, rotating workpiece between a starting point and an ending point on said workpiece, said workpiece being heated by an induction heating coil surrounding the workpiece and energized by a controllable power supply, as said coil scans along said workpiece at a scanning velocity, said method comprising the steps of:
a. scanning said coil along said workpiece between said starting point and said ending point;
b. creating a first signal representative of the instantaneous power being created by said coil during said scanning step;
c. creating a second signal representative of the instantaneous velocity during said scanning step;
d. combining the first signal and the second signal into a power-velocity signal as said coil scans said workpiece between said starting point and said ending point;
e. simultaneously comparing said power-velocity signal with a desired power-velocity signal for each position along said workpiece and during said scanning step; and,
f. adjusting said scanning velocity of said coil in accordance with said comparison during said scanning step.

* * * * *